C. SCHROEDER.
SKYLIGHT BAR.
APPLICATION FILED OCT. 6, 1908.
924,943.
Patented June 15, 1909.
2 SHEETS—SHEET 1.
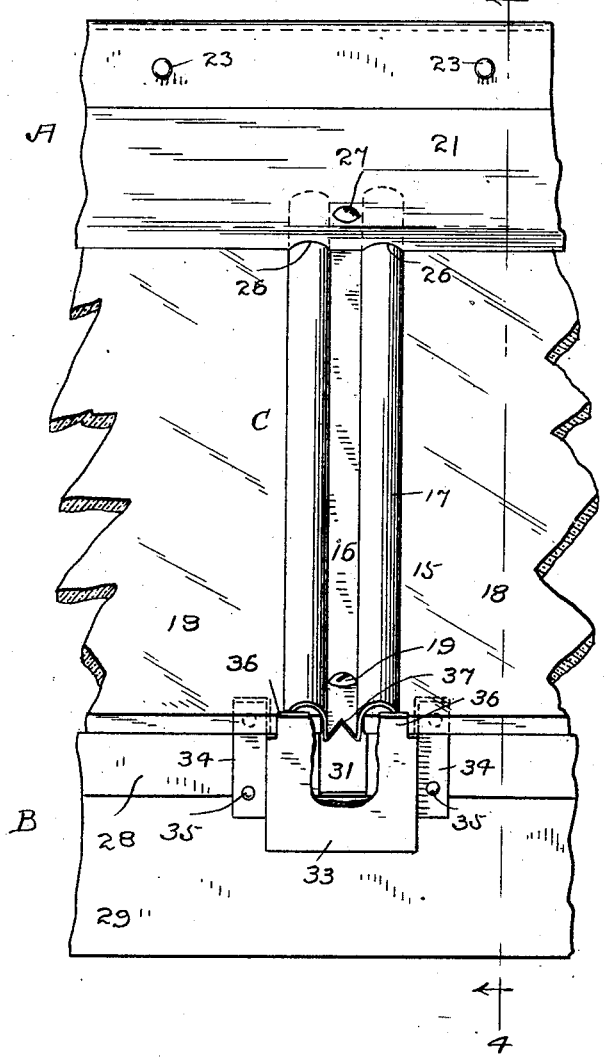
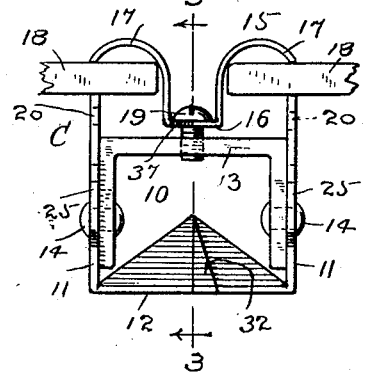
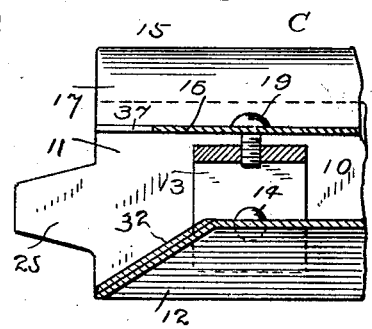
Witnesses:
H. A. Lamb.
S. W. Atherton.
Inventor
Charles Schroeder
By Attorney
N. M. Wooster C. SCHROEDER.
SKYLIGHT BAR.
APPLICATION FILED OCT. 6, 1908.
924,943.
Patented June 15, 1909.
2 SHEETS—SHEET 2.
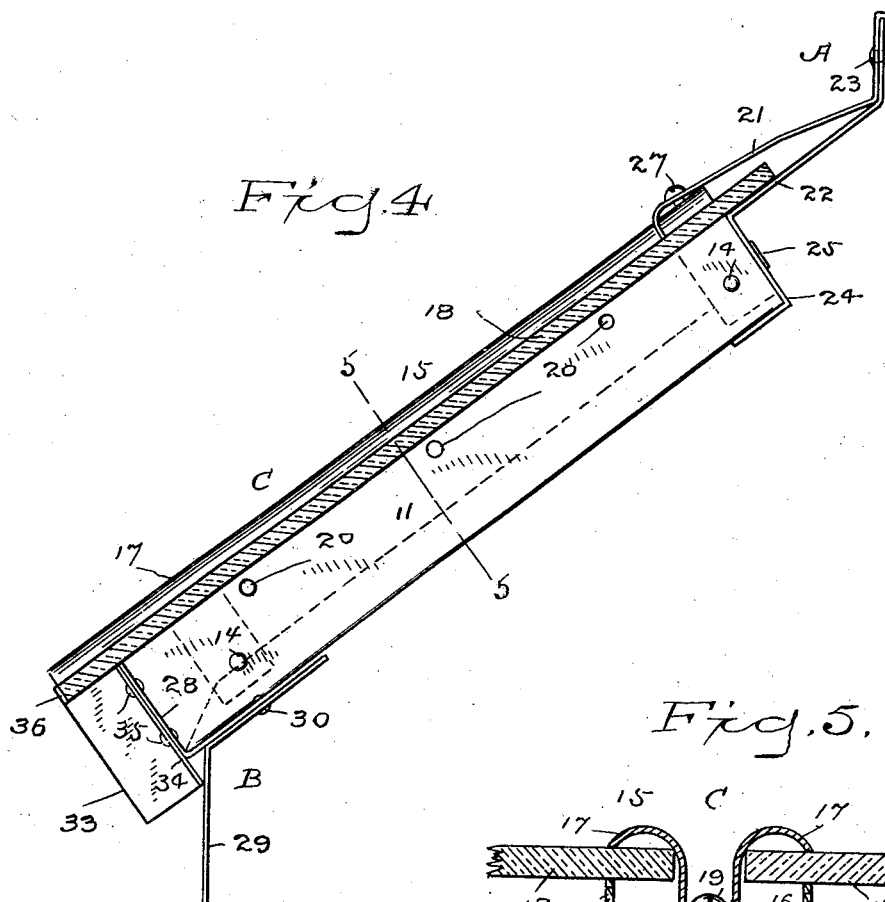
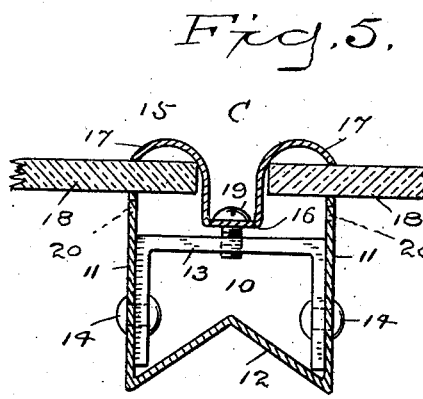
Witnesses:
H. A. Lamb
S. W. Atherton
Inventor
Charles Schroeder
By Attorney
A. M. Wooster

UNITED STATES PATENT OFFICE.

CHARLES SCHROEDER, OF BRIDGEPORT, CONNECTICUT.

SKYLIGHT-BAR.

No. 924,943.  Specification of Letters Patent.  Patented June 15, 1909.

Application filed October 6, 1908.  Serial No. 456,366.

*To all whom it may concern:*

Be it known that I, CHARLES SCHROEDER, a citizen of the United States, residing at Bridgeport, county of Fairfield, State of Connecticut, have invented a new and useful Skylight-Bar, of which the following is a specification.

This invention relates to skylights adapted for general use as upon factories, warehouses, greenhouses, etc. and has for its object to provide a skylight bar which shall be made without solder, will retain sheets of glass of any required thickness, will provide a ventilated, water-tight and fire-resisting joint between the sheets of glass, which will hold the glass in such a manner as to permit expansion or contraction without danger of breakage of glass and will do away with all condensation on the glass by giving the under side of the glass plenty of outside air and which shall be relatively inexpensive to produce and while adapted to all grades of work shall be especially adapted for use upon high grade and durable buildings as the structure of the bar will permit the use of as heavy metal as may be required, this being an important advantage as the skylight bars now in general use require that many bends be made in the metal and the constructions are such that they cannot be formed from sufficiently heavy metal for really high grade work.

With the above-stated and other objects in view I have devised the novel skylight bar, of which the following description in connection with the accompanying drawings is a specification, reference characters being used to indicate the several parts:

Figure 1 is a view of a section of skylight showing my novel skylight bar in perspective; Fig. 2 an elevation, on an enlarged scale, of the lower end of my novel skylight bar, showing the manner in which sheets of glass are held by the bar, the view being from the bottom of the sheet in Fig. 1; Fig. 3 a section on the line 3—3 in Fig. 2, looking in the direction of the arrows; Fig. 4 a longitudinal section on the line 4—4 in Fig. 1, looking in the direction of the arrows; and Fig. 5 is a transverse section of the bar and sheets of glass on the line 5—5 in Fig. 4.

A denotes the top piece of the frame, B the bottom piece, and C my novel skylight bar.

The structure of the bar is as follows: 10 denotes the body of the bar which is broadly U-shaped and comprises side pieces indicated by 11 and a bottom indicated by 12, which in order to give strength and rigidity to the bar is made inverted V-shape in cross section.

13 denotes inverted U-shaped braces which are made of heavier metal than the body and a plurality of which are placed within the body and rigidly secured thereto as by bolts 14.

15 denotes the cap piece of the bar which comprises a central longitudinal strip indicated by 16 and upwardly, outwardly and downwardly curved wings indicated by 17, the edges of which rest upon the sheets of glass, indicated by 18, to retain them in place, the edges of the sheets of glass preferably resting against the inner sides of the wings, as clearly shown in Figs. 2 and 5. The cap piece is adjustably secured to braces 13, to provide for different thicknesses of sheets of glass, by means of screws 19 which pass through strip 16 of the cap piece and engage the braces.

20 denotes air holes in the side pieces of the body which are provided for the purpose of ventilation, as will be more fully explained.

The top piece A of the frame comprises upper and lower plates indicated respectively by 21 and 22. The upper ends of the two plates are riveted together as at 23 in vertical position and form the ridge of the building. Below the ridge portion the lower plate lies at the incline of the skylight and the lower end thereof is bent to form an angular support 24 for the bars. The upper and lower ends of the side pieces of the bar are both provided with lugs 25. The upper ends of the bars of a skylight are fastened to the angular support 24 by means of these lugs which are passed through slots in the angular support and headed down on the inner side thereof, as shown in Fig. 4. Upper plate 21 of the top piece forms a flashing. It extends down over the upper edge of the glass and the upper ends of the bars and is curved downward upon the bars, the edge of the plate being provided with rounded sockets 26 which fit closely over the wings of the bar or bars. Screws 27 pass through the lower portion of plate 21, through strips 16 of the cap pieces of the bars and engage the U-shaped braces 13, these screws serving the same purpose as screws 19 except that they additionally retain the upper plate of the top piece of the frame.

The bottom piece B of the frame comprises upper and lower plates, indicated respectively by 28 and 29. The upper plate is in shape an angle plate and receives and supports the lower ends of the bars which are secured thereto by means of lugs 25 (see Figs. 2 and 3) on the side pieces which pass through slots in plate 28 and are headed down in the same manner that the upper ends of the bars are connected to angular support 24 of the top piece of the frame. Lower plate 29 of bottom piece B is riveted to plate 28, as at 30, and the lower edge thereof forms a flashing over the top of the wall of a building (not shown) and also receives any drip of water of condensation from within the bars. Openings 31 are provided in the outer side of plate 28 of the bottom piece to permit free entry of outside air into the bar and also to permit free escape of the water of condensation, and the lower end of the inverted V-shaped bottom of the body is provided with an incline 32 which may be formed by slitting the bottom backward at the ridge of the inverted V and bending the metal on opposite sides of the slit inward and downward, lapping one plate over the other, as clearly shown in Figs. 2 and 3.

33 denotes a U-shaped plate which serves as a storm shield and also as a glass stop and which is provided with flanges 34 by which it is riveted to the outer side of plate 28 on the bottom piece of the frame, as at 35. At the upper edge of this plate is a flange or glass stop 36 against which the lower edges of the two sheets of glass held by the bar rest. This U-shaped plate or storm shield extends below the end of the bar, as clearly shown in Fig. 4, and effectually prevents rain or snow from being driven into the bar. At the lower end of strip 16 of the cap piece I form an opening 37 through which water passing down the top of the cap plate may pass and drop within the storm shield and down upon plate 29 which, as already stated, serves as a flashing.

In use, the edges of the sheets of glass are retained by wings 17 of the cap piece of the bar in the manner clearly shown in Figs. 2 and 5. The sheets of glass rest upon the top of side pieces 11 of the body and the edges of the wings rest lightly upon the sheets of glass. This construction of the bar in connection with the glass stop on U-shaped plate 33 holds the sheets of glass against the possibility of movement in any direction but at the same time holds them lightly so that there is no pressure upon the glass and the glass is permitted to expand or contract without the slightest danger of breakage, both the edges and inner sides of the wings yielding sufficiently to permit ample expansion of the glass. An important feature of the invention is that the structure of the bar is such as to insure relatively uniform temperature on both the inner and outer sides of the sheets of glass. Air enters the bars freely by passing under the storm shield (U-shaped plates 33) and through openings 31 in the outer portion of plate 28 of the bottom piece of the frame, and air holes 20 in side pieces 11 of the body permit air to pass freely from the bar to the under side of the glass, or vice versa, the effect being to prevent condensation of moisture on the under side of the glass and to obviate all danger of breakage of the glass caused by changes in temperature.

Having thus described my invention I claim:

1. In a skylight, the combination with a bar comprising a U-shaped body, braces within the body and a cap piece secured to the braces, of a top frame piece comprising upper and lower plates, said lower plate comprising a support for the bar, and said upper plate extending over the bar.

2. In a skylight, the combination with a bar comprising a U-shaped body, braces within the body and a cap piece secured to the braces and having curved wings, for the purpose set forth, of a top frame piece comprising upper and lower plates, said lower plate comprising a support for the bar and said upper plate extending over the bar and having sockets which receive the wings.

3. In a skylight, the combination with a bar, comprising a U-shaped body having lugs at its upper end, braces within the body and a cap piece secured to the braces, of a top frame piece comprising upper and lower plates, said lower plate comprising an angular support for the bar and the lugs passing through said plate to secure the bar thereto and said upper plate extending over the bar.

4. In a skylight, the combination with a bar comprising a U-shaped body, braces within the body and a cap piece secured to the braces, of a bottom frame piece comprising upper and lower plates, said upper plate comprising a support for the bar and having an opening for the passage of water of condensation, and said lower plate comprising a flashing, and a U-shaped plate secured to the outer plate and covering the opening and forming a storm shield.

5. In a skylight, the combination with a bar comprising a U-shaped body, braces within the body and a cap piece secured to the braces and sheets of glass whose edges lie between the body and the cap piece, of a bottom frame piece comprising upper and lower plates, said upper plate comprising a support for the bar and having an opening for the passage of water of condensation, and said lower plate comprising a flashing, and a U-shaped plate secured to the upper plate and covering the opening and having at its upper edge a flange which serves as a stop for the lower end of the sheets of glass.

6. In a skylight, the combination with a bar comprising a U-shaped body with an inverted V-shaped bottom and having at its lower end an incline, for the purpose set forth, braces within the body and a cap piece secured to the braces and having at its lower end an opening, for the purpose set forth, of a bottom frame piece comprising upper and lower plates, said upper plate comprising a support for the bar and having an opening for the purpose set forth, and said lower plate comprising a flashing, and a U-shaped plate secured to the upper plate and forming a storm shield over the opening.

In testimony whereof I affix my signature, in presence of two witnesses.

CHARLES SCHROEDER.

Witnesses:
  A. M. WOOSTER,
  S. W. ATHERTON.